United States Patent [19]

Wentworth

[11] Patent Number: 4,557,489
[45] Date of Patent: Dec. 10, 1985

[54] PRESSURE BALANCED SEAL

[75] Inventor: Robert S. Wentworth, Temecula, Calif.

[73] Assignee: Borg-Warner Corporation, Chicago, Ill.

[21] Appl. No.: 592,494

[22] Filed: Mar. 23, 1984

[51] Int. Cl.⁴ .............................................. F16J 15/34
[52] U.S. Cl. ...................................... 277/65; 277/75; 277/96.1; 285/275
[58] Field of Search ..................... 277/65, 92, 75, 96.1; 285/99, 375, 267, 281

[56] References Cited

U.S. PATENT DOCUMENTS

| | | | |
|---|---|---|---|
| 3,460,857 | 8/1969 | Larkin | 277/96.1 |
| 3,804,424 | 4/1974 | Gardner | 277/96.1 |
| 3,975,991 | 8/1976 | Nakajima | 277/75 |
| 4,071,253 | 1/1978 | Heinen et al. | 277/65 |
| 4,299,398 | 11/1981 | Wahl | 277/65 |

Primary Examiner—Robert I. Smith
Attorney, Agent, or Firm—John W. Harbst

[57] ABSTRACT

A pressure balanced mechanical seal, especially adaptable for use in a swivel in an oil well drilling arrangement comprising a pair of relatively rotatable seal rings constructed of silicon carbide or tungsten carbide each received in a cavity defined by a cylindrical and a radial wall in the respective housing for the ring with the inner cylindrical surface of each exposed to high pressure, high temperature drilling mud and with means to communicate drilling mud to the outer cylindrical surfaces thereof, and means for balancing the axial forces on the rings and to insure sufficient axial forces for perfecting the seal. Tensional and compressive forces on the rings are minimized insuring reasonable life to the seal, far in excess of that in the conventional packings now used in the oil drilling system.

6 Claims, 5 Drawing Figures

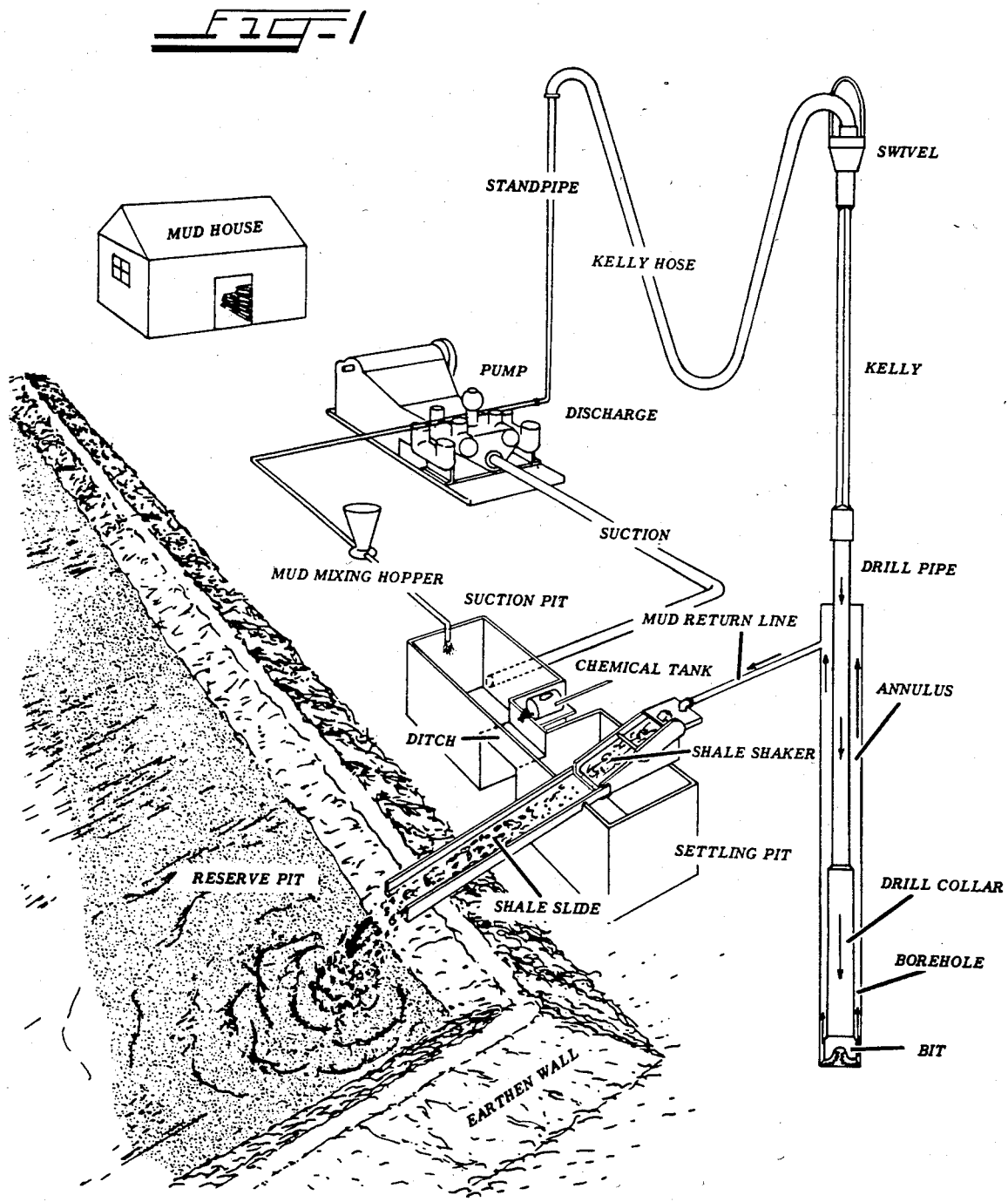

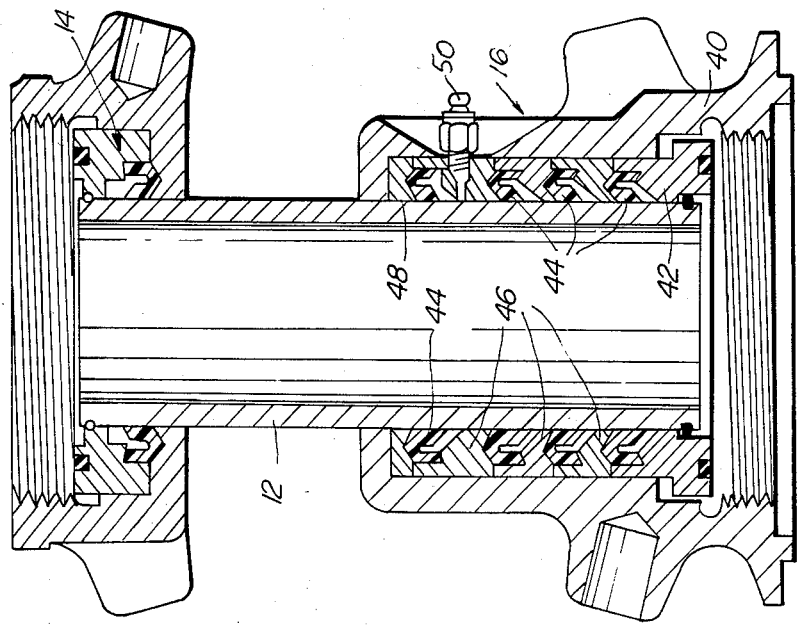
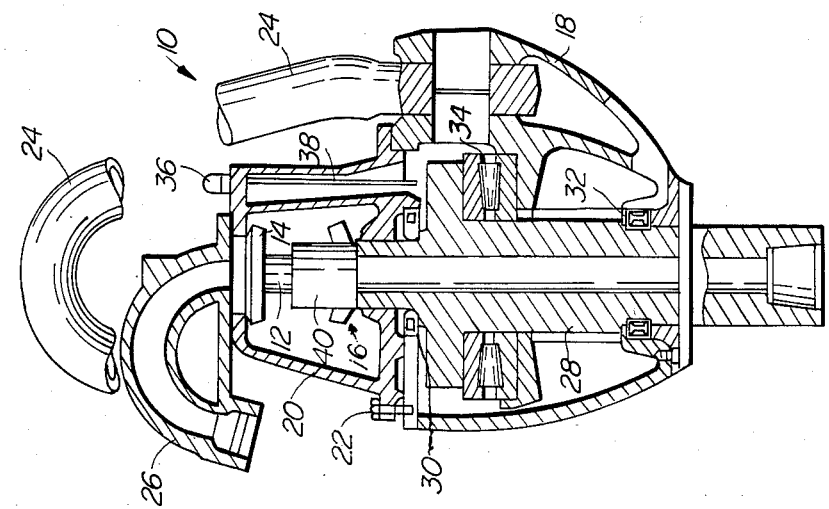

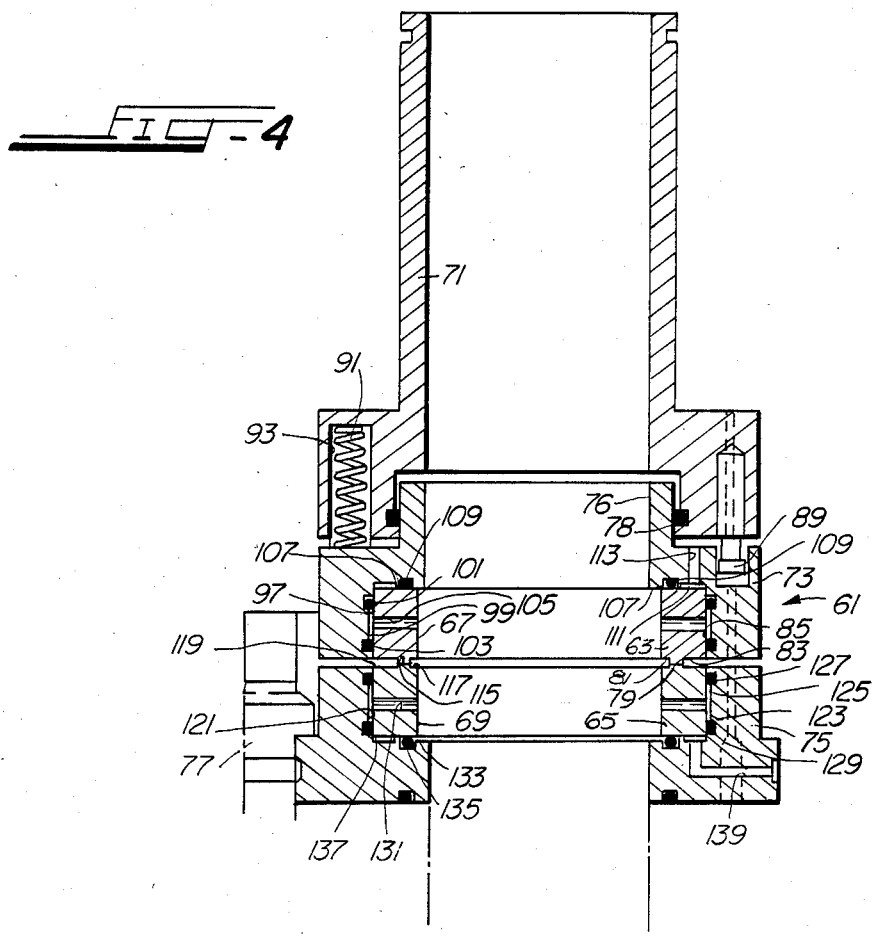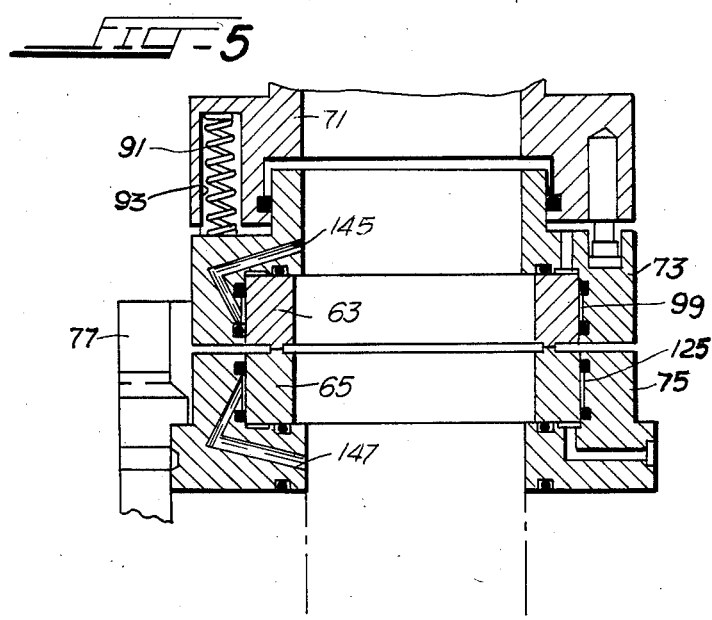

PRESSURE BALANCED SEAL

BACKGROUND OF THE INVENTION

This invention relates to improved fluid seals especially suitable for use in oil well drilling equipment in which fluid pressures of drilling mud, an abrasive slurry, may reach the magnitude of 5000 psi and temperatures may reach the magnitude of 200° F.

In a typical oil drilling apparatus, the rotating equipment, from top to bottom, begins at the swivel and extends down the string to the point where the bit contacts the bottom of the bore hole. The swivel assembly sustains the weight of the drilling string, permits its rotation, and affords a rotating pressure seal and passageway for circulating drilling mud into the top of the string. The kelly, which is connected to the stem of the swivel, transmits torque from the rotary to the drilling string and permits the string to be moved vertically as the string is lowered when making a hole. The kelly is also the unit through which drilling mud is pumped down the string. Drilling mud is usually a mixture of weighting materials, clay, chemicals and water or oil and is thus an abrasive slurry.

Within the system itself, travel of drilling mud is typically from the mud pit (a storage area) to the slush or mud pump, from the pump through a standpipe and kelly hose to the swivel and into the kelly via a wash pipe in the swivel and the stem, also in the swivel, and down the drill string to the bit, up the annular space between the drill string and the borehole, through a blowout preventer stack to the return flow line, to a shale shaker for cuttings removal, to a settling pit, and then to temporary storage in a sump pit.

The swivel generally contains the hollow stem to which the kelly is attached, the stem being journalled in spaced bearings to permit its rotation. The stem is connected to the kelly hose and the wash pipe through which the drilling mud is supplied by a pump from the supply. A packing is associated with the juncture of the stem and the wash pipe, and is constructed to permit relative rotation therebetween. The packing contains multiple elastomeric packing rings constrained within a packing housing. The stem and the kelly (and thus the drilling string) rotate at speeds up to about 400 rpm.

Because of the abrasive nature of the drilling mud, and the relatively high pressures and temperatures encountered, the packings have limited life, for example, on the order of 3 days to 3 weeks. Replacement and repair of the packings is a time consuming and expensive operation, requiring the interruption of the drilling operation, disasembly of the swivel, and reconstruction of the swivel.

PRIOR ART

U.S. Pat. No. 4,299,398, issued Nov. 10, 1981 entitled Pressure Compensating Shaft Seal relates to a mechanical seal for isolating high pressure abrasive-containing drilling mud. The patented structure comprises a plurality of telescoped seal rings isolating an intermediate chamber therebetween which is responsive to the pressure of the media being sealed for maintaining a negligible pressure drop across an outer seal ring between the media and the chamber and for protecting an inner seal ring between the chamber and a bearing from the abrasive mud media.

This arrangement requires telescoping seal rings in an arrangement which is difficult to service and requires many parts as compared to the arrangement to be described herein.

SUMMARY OF THE INVENTION

According to this invention, the conventional packing in a swivel is replaced with a pressure balanced seal assembly of relatively simple construction having much fewer parts and requiring less maintenance than the conventional packing. The seal of this invention can be expected to have a life of at least 3 to 6 months, thus reducing down-time for seal maintenance.

The invention comprises a pair of seal rings, preferably made of a ceramic, such as silicon carbide or tungsten carbide, and the like, each having a seal surface opposed to the other, one ring being resiliently urged toward the other, preferably by a plurality of coil springs. One of the rings is stationary and the other is rotatable. The seal surfaces are generally narrow and extend outward of the body of the ring. One ring is the mirror image of the other. Each ring is received in an open sided cylindrical cavity in a housing such that the outer cylindrical surface thereof is surrounded by a portion of the respective housing. The cavities are radially deeper than the radial dimension of the rings and the axial lengths of the cavities are substantially equal to the axial dimension of the ring received therein. Both rings have their internal cylindrical surfaces exposed to the drilling mud and passage means are provided to communicate the other and inner cylindrical surfaces of each ring. This is accomplished by providing radial passageways in each ring and surrounding the ring with spaced O-ring seals which perfect a seal with the surrounding housing. The housing can be ported to accomplish the same objective if necessary and/or desirable. The passage means communicating the inner and outer cylindrical surfaces of the rings minimizes the pressure differential which could, in the absence of the passage means, exist between the surfaces.

The seal is also constructed to minimize hydraulic pressures which could force each ring toward its backing member, i.e., a part of the housing. This is accomplished by venting a portion of one radial end surface of each ring to the atmosphere and, also, venting a similar portion of the other radial end surface of each ring to the atmosphere.

The overall effect of the construction described is to provide an effective mechanical seal assembly in which each seal ring is minimally affected by the pressures in the environment to which it is subjected.

BRIEF DESCRIPTION OF THE DRAWINGS

FIG. 1 is a schematic illustration of a typical prior art drilling rig arrangement showing a drilling mud circulation system;

FIG. 2 is a half-section view through a typical, prior art swivel and is labeled "PRIOR ART";

FIG. 3 is an enlarged, half-section view of the packing in the swivel of FIG. 2 and is labeled "PRIOR ART";

FIG. 4 is an enlarged full sectional view through a seal assembly constructed according to this invention; and FIG. 5 is an enlarged sectional view through a modification of the seal assembly of FIG. 4.

DETAILED DESCRIPTION OF THE PREFERRED EMBODIMENT

FIG. 1 of the drawings is an illustration of a typical prior art oil well drilling ring mud circulation system. Each part in the system is labeled and needs no further description.

FIGS. 2 and 3 of the drawings are labeled "PRIOR ART" and are, respectively, a half-section view taken through a swivel 10, and an enlarged half-section view illustrating the washpipe 12, the upper seal 14 and the packing 16 in the swivel 10. The swivel 10 (FIG. 2) comprises an outer housing 18 to which a housing cap 20 is connected by cap screws 22. The swivel 10 is suspended from a rig (not shown) by a bail 24, only a part of which is illustrated.

A goose neck 26 is connected to the housing cap 20 for the passage of drilling mud from a supply to and through the washpipe 12, to and through a stem 28, and to and through the kelly (see FIG. 1) to the drill string (also see FIG. 1). The washpipe 12 is stationary while the stem is arranged to rotate with the kelly and the drill string. Conventional means, not shown, are used to rotate the stem and the kelly. The stem 28 is journaled in spaced bearings 30 and 32 and the rotating assembly of the stem, kelly and drill pipe is supported by a thrust bearing 34. The outer housing 18 contains lubricating oil for the bearings which is supplied through a plug 36 with a connected oil level dipstick 38, so that the oil level can be periodically checked.

The upper seal 14 surrounds the washpipe 12 at the juncture with the gooseneck 26 and the packing 16 surrounds the washpipe 12 adjacent to the juncture thereof with the stem 28. The packing 16 is surrounded by a packing housing 40 threadably connected to the upper end of the stem 28, so that the housing 40 rotates with the stem 28. The packing 16 comprises a bottom adaptor ring 42, alternate elastomeric packing rings 44, alternate spacer rings 46, and an upper packing adapter 48. The housing 40 can be tightened down on the stem to adjust the packing 16, at least until parts thereof become worn and inefficient. After this, the assembly must be disassembled and rebuilt. Lubricating oil is supplied to the juncture of the packing 16 and the washpipe 12 through the fitting 50.

The present invention is directed to a pressure balanced mechanical seal structure 61 (see FIG. 4) to replace the packing 16. The mechanical seal 61 comprises a pair or seal rings 63 and 65 constructed of silicon carbide or tungsten carbide which are exposed at their inner cylindrical surfaces 67 and 69, respectively, to the drilling mud flowing through the washpipe 72 and seal housings 73 and 75. The housing 73 has a flange 76 extending into and sealed by an O-ring seal 78 to washpipe 71. The washpipe 71 is connected to the gooseneck (not shown in FIG. 4) in the same manner as the washpipe 12 illustrated in FIGS. 3 and 4 and a similar upper seal is used. Because the washpipe and gooseneck connection is the same as in the prior art, no further description is deemed necessary. The seal rings 63 and 65 have relatively large internal diameters, as for example, on the order of 3 to 4 inches.

The lower seal housing 75, is connected to a stem (not shown) by means of a cylindrical safety shield and nut 77 shown schematically. The nut replaces the part 40 in FIGS. 2 and 3.

Upper seal ring 63 has a relatively narrow seal face 79 with inner and outer dimensions less than the inner and outer dimensions of the ring 63. Thus there are defined three radially oriented surface areas, namely, seal face 79 flanked by inner radial surface 81 and outer radial surface 83. Ring 63 is received in an open-ended cavity 85 defined by a cylindrical wall and a radial wall in upper housing 73. The cavity 85 is radially deeper than the ring 63, and a portion of the housing 73 axially extends over the axial dimension of the ring 63. Studs 89, only one of which is shown, carried by washpipe 71, extend into upper housing 73 and eliminate relative rotation between the washpipe 71 and the upper housing 73. A plurality of springs 91, only one of which is shown, carried in pockets 93 in the washpipe 71, resiliently urge upper housing 73 in a downward direction, thus providing the spring force to urge seal ring 63 toward seal ring 65.

The outer cylindrical surface 97 of the seal ring 63 defines with the housing 73 a narrow cylindrical cavity 99, and O-rings 101 and 103 adjacent the ends of ring 63 and between ring 63 and housing 73 further define the cavity 99. A passageway 105 extending radially through the ring 63 communicates the inner and outer surfaces 67 and 97 of ring 63 and thus permits the passage of mud flowing through the washpipe to the stem into the cavity 99.

The end surface 107 of the upper seal ring 63 is supported by the sealed to the housing 73 by an O-ring 109, and the housing is grooved to provide a shallow, circular cavity 111 with the surface 107. The cavity 111 is vented to the atmosphere by a passage 113 through the upper housing 73.

The lower seal ring 65 is a mirror image of the upper seal ring 63 and has a relatively narrow seal face 115 with inner and outer dimensions less than the inner and outer dimensions of the seal ring 65. The face 115 is directly opposed to the seal face 79 of the seal ring 63. Three radial surfaces are defined, namely the seal face 115 flanked by inner radial surface 117 and outer radial surface 119. The seal ring 65 is received in an open-ended cavity 121 defined by a cylindrical wall and a radial wall in lower housing 75; the lower housing being connected to the stem by the safety shield and the nut 77 so as to rotate therewith. The cavity 121 is radially deeper than the seal ring 65, and portion of the housing 75 extends over the axial dimension of the seal ring 65. Thus, the seal ring 65 is arranged to rotate relative to the seal ring 63.

The outer cylindrical surface 123 of the seal ring 65 defines with the housing 75 a narrow cylindrical cavity 125, and O-rings 127 and 129 adjacent the ends of the seal ring 65 further define the cavity 125. A passageway 131 extending radially through the ring 65 communicates the inner and outer surfaces 69 and 123 of seal ring 65 and thus permits the passage of mud flowing through the washpipe to the stem into the cavity 125.

The end surface 133 of the seal ring 65 is supported by and sealed to the housing 75 by an O-ring 135 and the housing is grooved to provide a shallow circular cavity 137 with the surface 133. The cavity 137 is vented to the atmosphere by a passage 139 through the housing 75.

As will be apparent from FIG. 4 of the drawings, the seal rings 63 and 65 are recessed by making the ID of the rings larger than the ID of the washpipe 71 and the stem, so that their inner surfaces 67 and 69 are protected from erosion by avoiding direct impingement of the mud thereon which would occur if the IDs were the same. The flow of the drilling mud will be substantial laminar along the surfaces 67 and 69.

The radial surfaces 83 and 119 of the seal rings 63 and 65, respectively, are exposed to the atmosphere because the housings 73 and 75 are slightly spaced from each other. Areas defined by the surfaces 83 and 119 are substantially the same as the circular areas defining the cavities 111 and 133. Because the cavities 111 and 133 are vented to the atmosphere, the net axial pressure effect on the seal rings 63 and 65 is substantially zero.

The inner surfaces 67, 69 and outer surfaces 97, 123 of the two seal rings 63 and 65 are exposed to the product fluid, i.e., drilling mud, and its pressure and and temperature because of the cavities 99 and 125 and the passageways 105 and 131. Thus the radial pressure differentials are extremely low and the rings are thus not subjected to extreme radial pressure differentials.

The axial pressure urging the rings 63 and 65 toward one another is also low when compared to the pressure of the drilling mud. These axial pressures are supplied by the springs 91 and reduced by the product pressure on the radial face surfaces 81 and 117.

Seal rings as used in the described structure and constructed of silicon carbide or tungsten carbide are strong when placed in compression but are relatively weak when placed in tension. The arrangement described is such to substantially minimize tensional forces on the seal rings. Unbalanced radial and axial force differentials on the inner and outer surfaces and also on the radial surfaces of the seal rings are substantially minimized.

The appended claims are intended to cover all reasonable alternative constructions of the seal above described. For example, the housings can be drilled to provide passages 145 and 147 (FIG. 5) to provide communication between the cavities 99 and 125 surrounding the outer surfaces 97 and 123 if found desirable without departing from the spirit of the invention. The passages 145 and 147 function in the same manner as passageways 105 and 131 in the seal rings 63 and 65, respectively, FIG. 4.

I claim:

1. A pressure balanced mechanical seal adapted to be placed between a pair of relatively rotatable hollow cylindrical housings and adapted to substantially reduce the leakage of relatively high pressure fluid therebetween, said mechanical seal comprising:
   means defining an open-ended cylindrical cavity in each said housing including a cylindrical and a radial wall, said cavities being opposed to one another and being substantially identical in size and shape;
   a seal ring in each cavity, each seal ring being arranged generally coaxial relative to the other and having inner and outer cylindrical surfaces and radial end surfaces;
   a projecting annular seal face on end surface of each ring, said seal faces opposing and in sealing relationship with one another, and a second annular surface on another end surface of each seal ring, the second annular surfaces being opposed and spaced from each other;
   elastomeric means disposed between the outer cylindrical surface of each seal ring and the adjacent cylindrical wall of said cavity for establishing a pressure chamber about each seal ring;
   means to expose the inner cylindrical surface and surrounding pressure chamber of each seal ring to said high pressure fluid; and
   means to expose said second annular surfaces and substantially equal annular surfaces on the end surfaces of each seal ring to the pressure of a different fluid, the pressure of said different fluid on said second annular surfaces and substantially equal annular surfaces on the end surfaces being substantially equal;
   whereby radial and axial pressure differentials on said seal rings are each minimized.

2. A pressure balanced mechanical seal as recited in claim 1, wherein one seal ring is the mirror image of the other seal ring.

3. A pressure balanced mechanical seal assembly especially constructed for use in a swivel of an oil drilling rig in which drilling mud under relatively high temperature and pressure flows from a source through a washpipe to a rotatable hollow stem and into the kelly to the drill string, the seal assembly being located between the washpipe and the stem and permitting the stem to rotate relative to the washpipe and comprising:
   first and second hollow generally cylindrical housings connected respectively to said washpipe and said stem;
   means defining an open-ended cavity in each housing, each cavity including a cylindrical wall and a radial wall, and being axially opposed to one another;
   a first and a second generally cylindrical seal ring, each received in a housing cavity, each seal ring being generally coaxial relative to the other and is defined by inside and outside cylindrical surfaces and radial end surfaces;
   each said cavity having a radial depth in excess of the radial thickness of the seal ring therein so that the inside surface of the seal ring is recessed from the inside surfaces of said housing, washpipe and stem;
   relatively shallow cylindrical cavities defined by the outside cylindrical surface of each ring and its respective housing;
   a spaced pair of elastomeric rings arranged in each of said shallow cavities and in sealant contact with the outside cylindrical surface of said seal ring and its respective housing for defining a pressure chamber about each ring;
   means to communicate the inside and outside surfaces of each seal ring and thus permit the passage of drilling mud to the respective pressure chamber;
   radial cavities each defined by a radial end surface of each seal ring and its respective housing;
   means venting each radial cavity to the atmosphere;
   one radial end surface of each ring having a sealing surface and a second, outwardly disposed radial surface;
   means venting said outwardly disposed radial surface of each ring to the atmosphere
   whereby radial and axial pressure differentials on the inside and outside cylindrical surfaces and on the end surfaces of each seal ring are substantially and materially minimized; and
   means for urging the sealing surface of one seal ring toward the sealing surface of the other seal ring.

4. A mechanical seal assembly especially constructed for use in a swivel of an oil drilling rig in which drilling mud under relatively high temperature and pressure flows from a source through a washpipe to a rotatable hollow stem and into the kelly to the drill string, the seal assembly being located between the washpipe and the stem and permitting the stem to rotate relative to the washpipe and comprising:

a hollow, generally cylindrical housing connected to said washpipe;

means defining an open sided cavity in said housing;

a hollow, generally cylindrical seal ring received in said housing cavity and defined by inside and outside cylindrical surfaces and radial end surfaces;

said cavity having a radial depth in excess of the radial thickness of said seal ring so that the inside surface of said seal ring is recessed from the inside surfaces of said housing and washpipe;

said cavity also having an axial dimension substantially equal to the axial thickness of said seal ring;

a relatively shallow cylindrical cavity defined by said housing and the outside cylindrical surface of said ring;

a pair of spaced elastomeric ring means arranged in said cavity in a sealant manner between the outside cylindrical surface of said seal ring and its housing to establish a pressure chamber;

means to communicate said inside and outside surfaces of said ring and thus permit the passage of drilling mud to said pressure chamber;

a radial cavity defined by said housing and one end surface of said seal ring;

means venting said radial cavity to the atmosphere;

one radial end surface of said seal ring having a sealing surface and a second, outwardly disposed radial surface;

means venting said outwardly disposed radial surface to the atmosphere;

whereby radial and axial pressure differentials on the inside and outside cylindrical surfaces and on the radial end surfaces of said seal ring are substantially and materially minimized;

a second hollow, generally cylindrical housing connected to said stem and adapted to be rotated therewith;

means defining an open sided cavity in said second housing;

a hollow, generally cylindrical seal ring received in said cavity in said second housing and defined by inner and outer cylindrical surfaces and radial end surfaces;

said second seal ring being a mirror image of said first seal ring and is coaxially arranged relative thereto:

said cavity in said second housing having a radial depth in excess of the radial thickness of said second seal ring so that the inner surface of said second seal ring is recessed from the inner cylindrical surface of said second housing and stem;

said cavity in said second housing also having an axial dimension substantially equal to the axial thickness of said second seal ring;

a second relatively shallow cylindrical cavity defined by said housing and the outer surface of said second ring;

another pair of spaced elastomeric ring means arranged in said second shallow cavity in a sealant manner between the outside cylindrical surface of said second seal ring and its housing to establish a second pressure chamber;

means to communicate said inner and outer surfaces of said second seal ring and thus permit the passage of drilling mud to said second pressure chamber;

a second radial cavity defined by said housing and one end surface of said second seal ring;

means venting said second radial cavity to the atmosphere;

one radial end surface of said second seal ring having a sealing surface opposite to the sealing surface of said first-named seal ring and a second, radially outwardly disposed surface;

means venting said second-named outwardly disposed surface to the atmosphere;

whereby radial and axial pressure differentials on the inner and outer cylindrical surfaces and on the radial end surfaces of said second ring are substantially and materially minimized; and means for urging said sealing surface of said first seal ring toward the sealing surface of said second seal ring.

5. A mechanical seal assembly as recited in claim 4, wherein each seal ring is constructed of the same material.

6. A mechanical seal assembly as recited in claim 5, wherein said elastomeric ring means arranged in said cavities comprise O-rings.

* * * * *